United States Patent [19]
Takizawa

[11] Patent Number: 5,365,445
[45] Date of Patent: Nov. 15, 1994

[54] ENGINE POWER TROUBLE DETECTING METHOD AND APPARATUS BY CHECKING ACTUAL ENGINE POWER CONDITION

[75] Inventor: Satoshi Takizawa, Yokosuka, Japan

[73] Assignee: Nissan Motor Company, Ltd., Yokohama, Japan

[21] Appl. No.: 741,772

[22] Filed: Aug. 7, 1991

[30] Foreign Application Priority Data

Aug. 8, 1990 [JP] Japan .................... 2-209867

[51] Int. Cl.⁵ .................... B60K 41/08; G07C 5/08
[52] U.S. Cl. .................... 364/431.01; 364/424.1; 123/339
[58] Field of Search .............. 364/424.1, 442, 431.05, 364/431.01; 74/864, 866, 860, 862, 863, 868, 856; 340/439; 123/480, 339

[56] References Cited

U.S. PATENT DOCUMENTS

| | | | |
|---|---|---|---|
| 4,539,868 | 9/1985 | Habu | 74/864 |
| 4,604,700 | 8/1986 | Igarashi et al. | 364/424 |
| 4,622,637 | 11/1986 | Tomita et al. | 364/424.1 |
| 4,667,541 | 5/1987 | Shimaoka et al. | 74/866 |
| 4,677,556 | 6/1987 | Habu | 364/424.1 |
| 4,691,285 | 9/1987 | Takeda | 364/424.1 |
| 4,724,810 | 2/1988 | Poirier et al. | 123/339 |
| 4,731,727 | 3/1988 | Rauch et al. | 364/424 |
| 4,853,673 | 8/1989 | Kido et al. | 340/439 |
| 4,868,756 | 9/1989 | Kawanabe et al. | 364/442 |

Primary Examiner—Thomas G. Black
Assistant Examiner—Jacques Harold Louis-Jacques
Attorney, Agent, or Firm—Lowe, Price, LeBlanc & Becker

[57] ABSTRACT

In an engine power trouble detecting apparatus, an abnormal condition occurring in power or torque of an engine of a vehicle is detectable, The detecting apparatus comprises: a first unit for predicting a power value derived from the engine of the vehicle driven under normal state based upon at least a revolution value of the engine and also an air intake amount thereof; a second unit for calculating an actual power value of the engine based upon at least a power value produced from a power shaft of a manual power transmission system; and also a third unit for comparing the predicted power value with the calculated actual power value so as to detect the abnormal condition.

22 Claims, 16 Drawing Sheets

PRESENT GEAR POSITION JUDGEMENT

MODIFIED ACTUAL POWER CALCULATION

ENGINE POWER TROUBLE DETECTING METHOD AND APPARATUS BY CHECKING ACTUAL ENGINE POWER CONDITION

BACKGROUND OF THE INVENTION

1. Field of the Invention

The present invention generally relates to a method and an apparatus for detecting power trouble of engines. More specifically, the present invention is directed to a method and an apparatus for detecting abnormal, or extraordinary, conditions occurring in power from automobile engines by checking actual engine power conditions.

2. Description of Prior Arts

Various techniques and publications describing detections of engine power troubles have been opened, for instance, in "Nissan (trademark) Service Manual for VG type Engines (A260U04)" issued in June, 1987.

The idea of the engine power trouble detecting apparatus as described in the above service manual is such that when trouble or abnormal states happen to occur in an engine controlling unit during normal drive condition of vehicles, this trouble is detected and warning is given to a car driver.

As described above, the conventional engine power trouble detecting apparatuses own the following drawbacks. That is, only the abnormal conditions of various components such as the engine controlling unit, sensors and actuators are detected, but no detection is made of actual engine power, or power conditions. As a consequence, even when trouble happens to occur in the actual engine power, such a trouble could be merely detected by a car driver himself or a maintenance work periodically performed in a service factory.

The present invention has been made in an attempt to solve the above-described drawbacks and therefore has an object to provide a novel method and also a novel apparatus for detecting engine power trouble based upon actual engine power conditions.

SUMMARY OF THE INVENTION

To achieve the above-described object and other features of the present invention, a method for detecting engine power trouble comprising the steps of:

predicting a power value (To') drived from the engine (1) of the vehicle driven under normal state based upon at least a revolution value (Ne) of the engine (1) and also an air intake amount (Q) thereof;

calculating an actual power value (To) of the engine (1) based on at least a power value (T) derived from a power shaft of a power transmission system (7:18); and, comparing the predicted power value (To') with the calculated actual power value (To) thereby to detect the extraordinary condition occurring in the power from the engine (1) driven under the normal state.

Furthermore, an engine power trouble detecting apparatus (1000), according to the present invention, comprises:

means (200) for predicting a power value (To') derived from an engine (1) of a vehicle driven under normal state based upon at least a revolution value (Ne) of the engine (1) and also an air intake amount (Q) thereof;

means (210) for calculating an actual power value (To) of the engine (1) based upon at least a power value (To) produced from a power shaft of a manual power transmission system (7); and, means (220) for comparing the predictive value (To') predicted by the power predicting means (200) with the actual power value (To) calculated by the actual power calculating means (210) thereby to detect an extraordinary condition occurring in the power from the engine (1) driven under the normal state.

DETAILED DESCRIPTION OF PREFERRED EMBODIMENTS

Basic Idea

Figure 1:
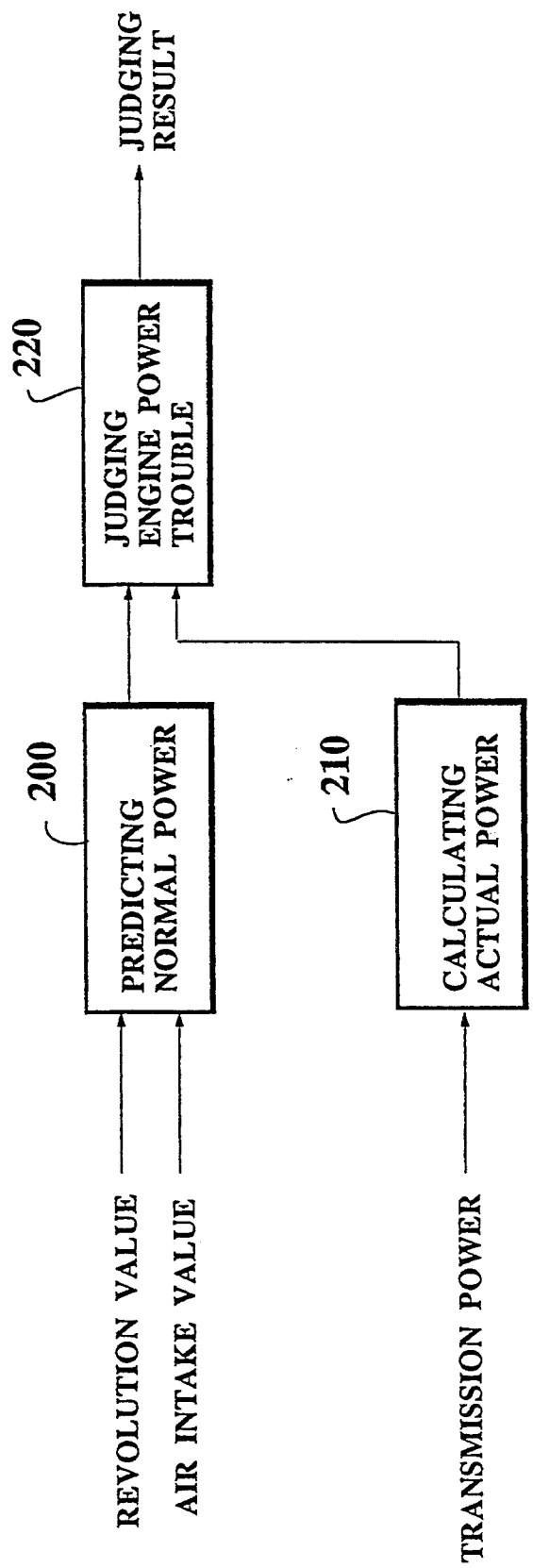
FIG. 1 is a schematic block diagram for explaining a basic idea of the present invention.

Referring now to FIG. 1, a basic idea of an engine trouble detection according to the present invention will be described.

The engine trouble detecting system shown in FIG. 1 mainly employs first means (200) for predicting normal engine power based upon at least an engine revolution value and an air intake amount for the engine; second means (210) for calculating an actual value of engine power based upon at least power outputted from an engine power transmission system; and also third means (220) for judging whether or not the engine is brought into a normal state or an abnormal state by comparing the predicted engine power with the calculated engine power.

In accordance with this engine trouble detecting system based on the basic idea of the present invention, the normal value for engine power is predicted by the first means 200 based upon at least the revolution value and also the air intake value. On the other hand, the actual value of engine power is calculated by the second means 220 based on the power outputted from the transmission system. Finally, the actually calculated engine power value is compared with the predicted engine power value by the third means 220, so that a decision is made whether or not the present engine condition is the normal state under the normal driving operation of the vehicle.

Overall Arrangement of First Engine Power Trouble Detecting Apparatus

Figure 2:
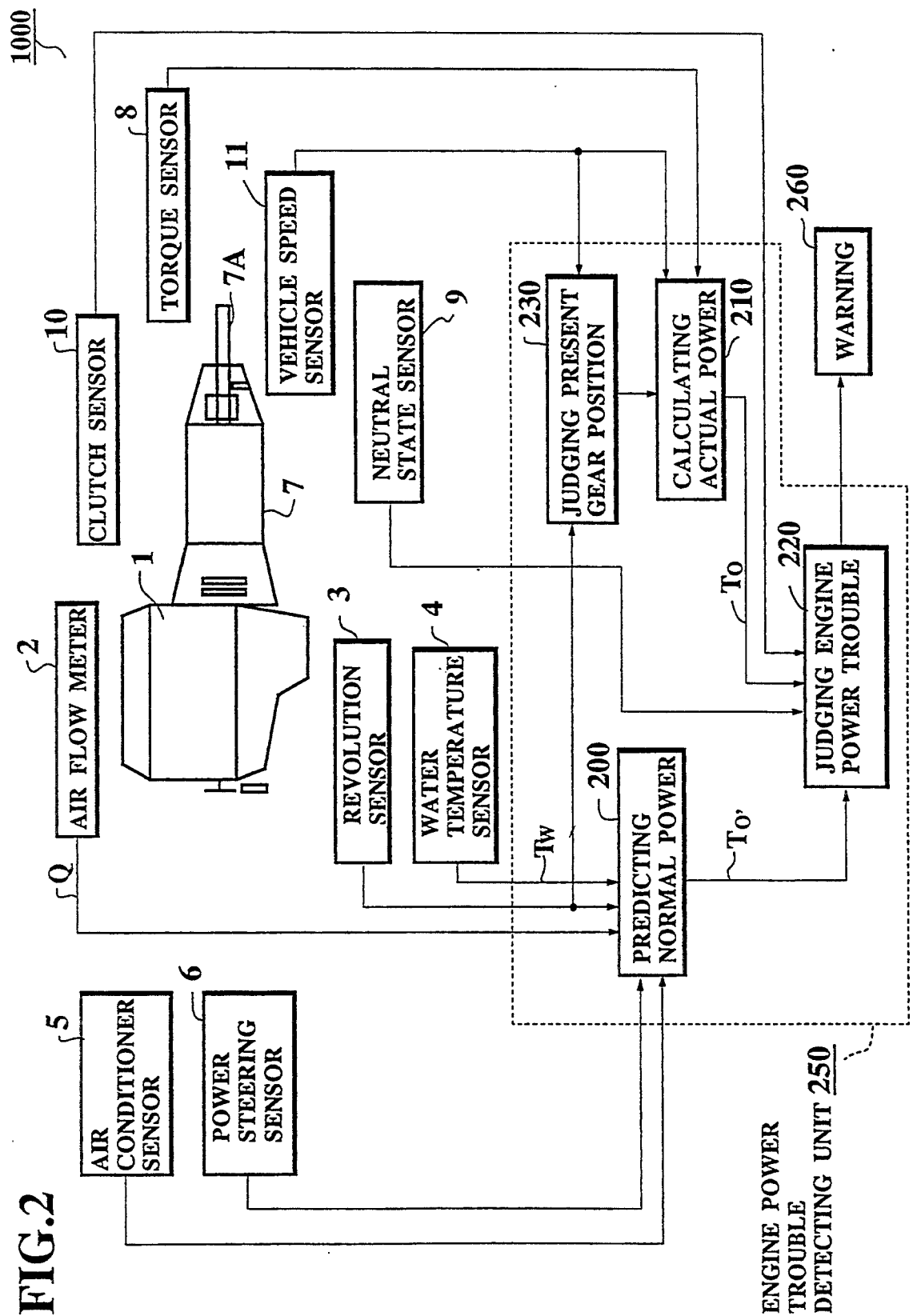
FIG. 2 is a schematic block diagram for showing an overall arrangement of an engine power trouble detecting apparatus (1000) according to a first preferred embodiments of the present invention.

FIG. 2 represents an overall arrangement of an engine power trouble detecting apparatus 1000 according to a first preferred embodiment of the present invention, which is constructed based on the above-described basic idea and is applied to an automobile equipped with a manual transmission system.

In FIG. 2, reference numeral 1 indicates an engine of this automobile (not shown in detail), and reference numeral 2 represents an air flow meter for detecting an amount "Q" of air Intake In the engine 1. Furthermore, a sensor 3 is employed to detect a revolution value of the engine 1; a sensor 4 is to detect temperatures of cooling water for the engine 1; a sensor 5 is to turn ON/OFF an air conditioner (not shown) employed in the automobile; and also another sensor 6 is to turn ON/OFF a power steering system (not shown either). Also, reference numeral 7 denotes a power transmission system; reference numeral 8 indicates a torque sensor provided on a power shaft 7A of the power transmission system 7; reference numeral 9 denotes a neutral state sensor for detecting a neutral state of the transmission system 7; reference numeral 10 indicates a clutch sensor for detecting ON/OFF states of a clutch (not shown); and also reference numeral 11 represents a vehicle speed sensor.

This first engine power trouble detecting apparatus 1000 further includes a major unit 250, i.e., "an engine power trouble detecting unit". The engine power trouble detecting unit 250 is constructed of the above-described normal power detecting means 200, actual power calculating means 210, and engine trouble judging means 220, and also gear position judging means 230 for judging positions of actually used gears (i.e., present gear position) for the transmission system 7 (will be described more in detail). Furthermore, the first engine power trouble detecting apparatus 1000 employs a warning unit 260 for warning an occurrence engine trouble to a car driver.

Internal Arrangement of First Engine Power Trouble Detecting Unit

Figure 3:
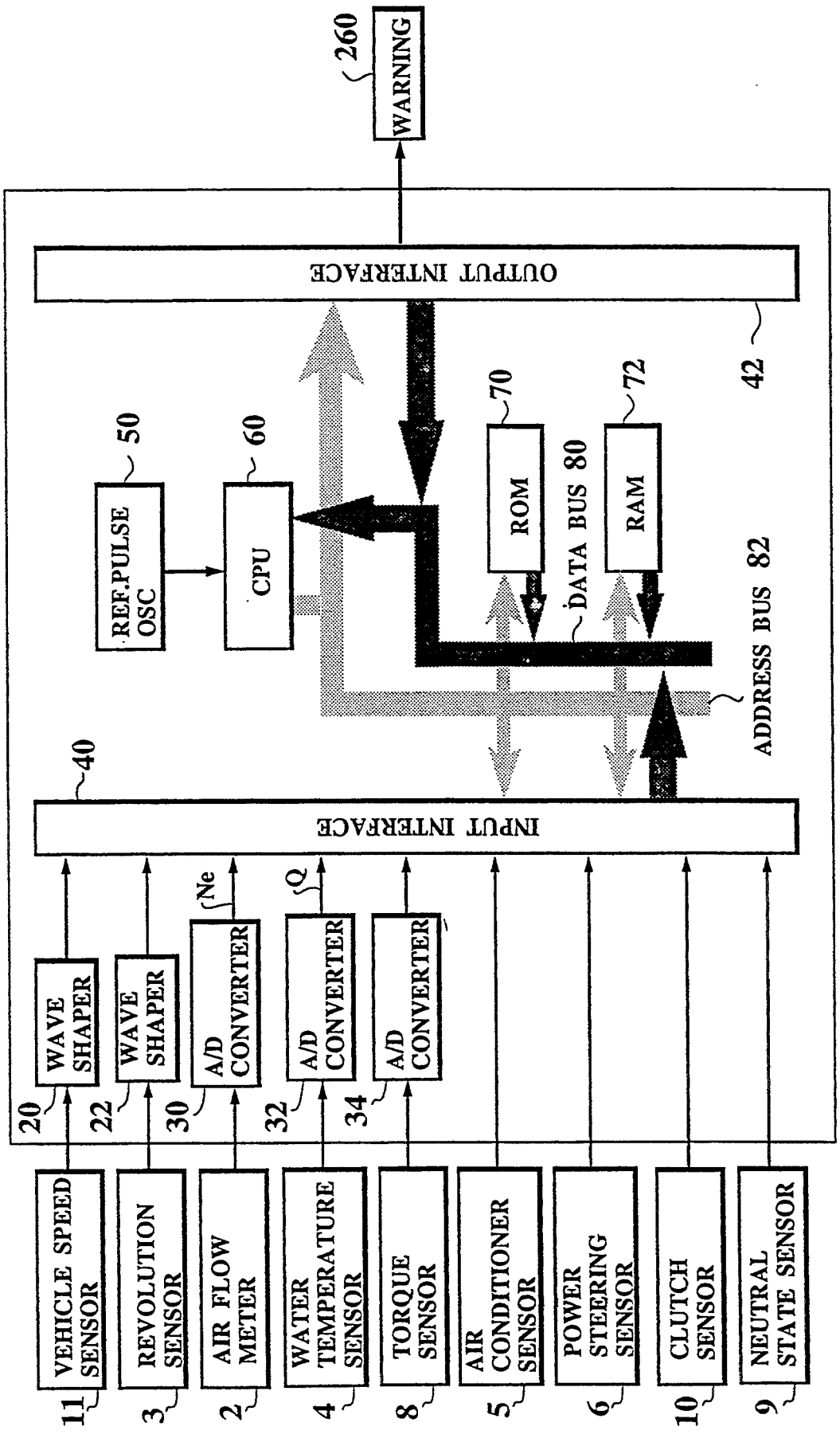
FIG. 3 is a schematic block diagram for showing an internal arrangement of the engine power trouble detecting unit 250 shown in FIG. 2.

Referring now to FIG. 3, an internal arrangement of the above-described engine power trouble detecting unit 250 will be described.

In this first engine power trouble detecting unit 250 shown in FIG. 3, a sensor signal derived from the vehicle speed sensor 11 is shaped by a first wave shaper 20 and then the resultant sensor signal is supplied to an input interface unit 40. Similarly, a sensor signal derived from the engine revolution sensor 3 is shaped in a second wave shaper 22 and then the resultant sensor signal is supplied to the input interface unit 40. The output analog signals from the air flow meter 2, water temperature sensor 4 and torque sensor 8 are A/D-converted by A/D converters 30, 32 and 34, respectively, so that these output signals in a digital form are supplied to the input interface unit 40.

A reference pulse oscillator 50 is employed to oscillate a reference clock pulse. In response to this reference clock pulse, a central processing unit 60 executes predetermined processes with the above-described sensor output data. Both a read-only memory (ROM) 70 for previously storing a system program, and a random access memory 72 for temporarily storing various data (will be described later) therein are connected via a data bus 80 and an address bus 82 to not only CPU 60 but also the input interface unit 40 and an output interface unit 42. The output interface unit 42 is also coupled to the warning unit 260.

Normal Power Prediction

Figure 4:
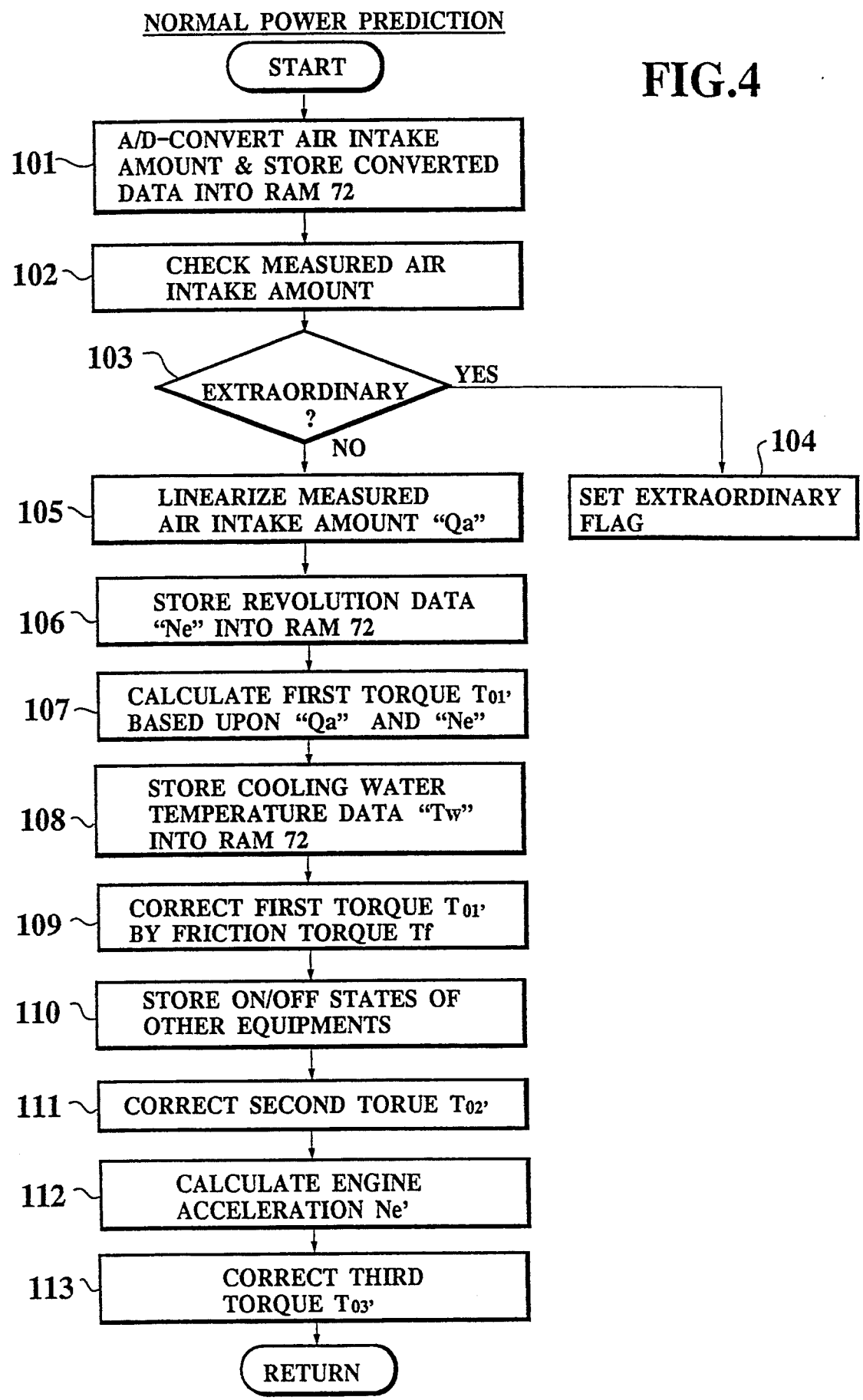
FIG. 4 through 18 show how to detect engine power trouble by the first engine power trouble detecting apparatus (1000) shown in FIG. 3.

FIG. 4 is a flowchart for explaining a prediction process of normal power performed by the normal power predicting means 200 employed in the above-described first engine power trouble detecting unit 250 shown in FIG. 3.

Figure 5:
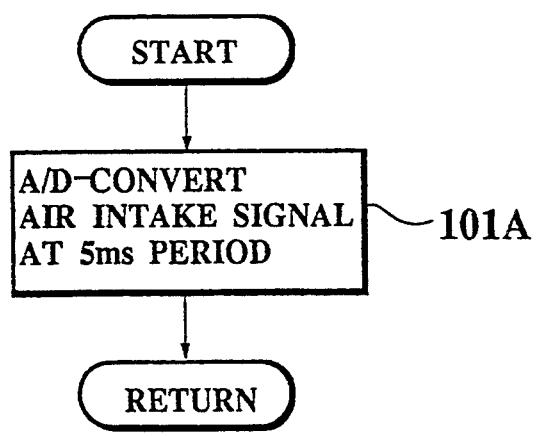

At a first step 101 of this flow chart, a signal of the air flow meter 2 indicative of the air intake amount "Q" is A/D-converted by the first A/D converter 30 shown in FIG. 3, whereby the digital air flow signal, or data is supplied via the input interface 40 to RAM 72. This A/D conversion of the signal indicating the air intake amount "Q" is executed at, for instance, 5 ms (milliseconds) period as represented in a step 101A of a flow chart of FIG. 5. Subsequently, a judgement is made at steps 102 and 103 whether or not the A/D-converted air intake data is within a predetermined rage under control of CPU 60. In other words, a check is done whether or not the air intake amount measured by the air flow meter 2 is deviated from the normal air intake amount. If YES, then a predetermined process for the engine power trouble is carried out at the next step 104. In this process, for instance, an extraordinary flag is set so as to prohibit the above-described engine power trouble judging process.

Figure 6:
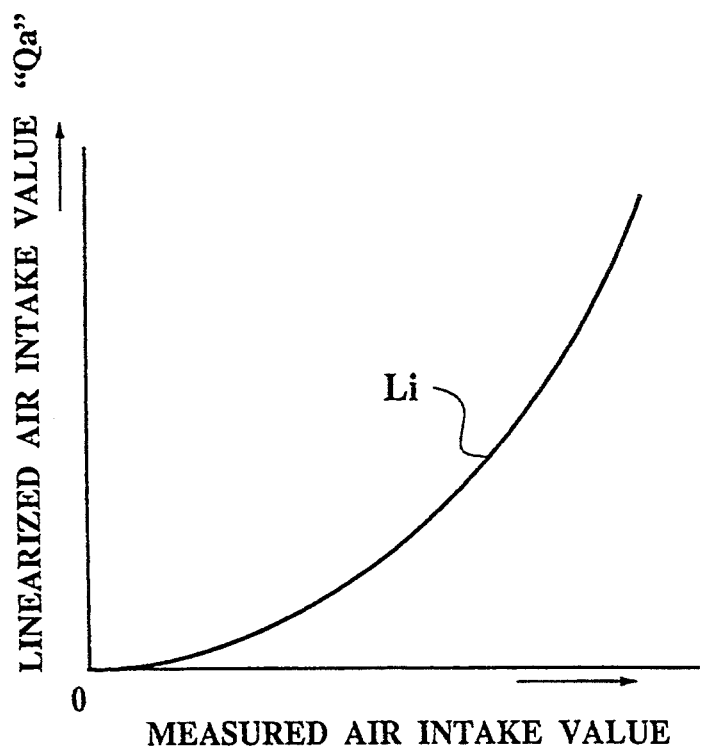

To the contrary, if the measured air intake amount is not extraordinary, i.e., within a predetermined range, then this process is advanced to a further step 105. At this step 105, the measured air-intake amount data is linearized in accordance with a linearizing characteristic "Li" for the air flow meter 2 as indicated in FIG. 6, whereby linearized air-intake amount data "Qa" is obtained.

Figure 7A:
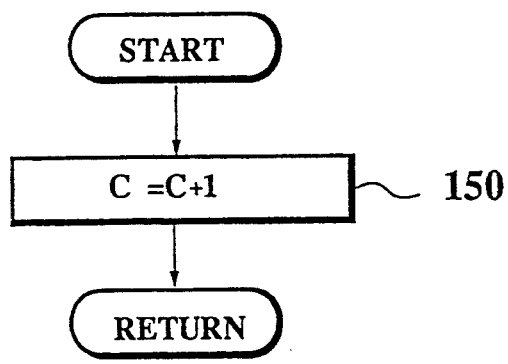
Figure 7B:
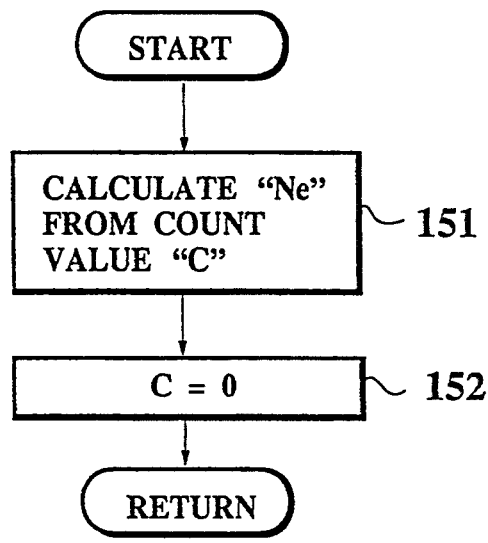

Subsequently, the process is advanced to a step 106 at which the revolution signal of the engine 1 derived from the engine revolution sensor 3 is first shaped in the wave shaper 22 and the resultant revolution data "Ne" is stored via the input interface 40 to RAM 72. The engine revolution process is performed as follows. As shown in FIG. 7A, the pulse signals outputted from the revolution sensor 3 are counted for a predetermined time, 100 ms (milliseconds), at a step 150. Then, at the next step 151 shown in FIG. 7B, the revolution value "Ne" of the engine 1 is calculated based on the count value "C" and thereafter, this count value "C" is initialized as "zero" at a step 152. Next, the pulse signals from the revolution sensor 3 are counted.

Figure 8:
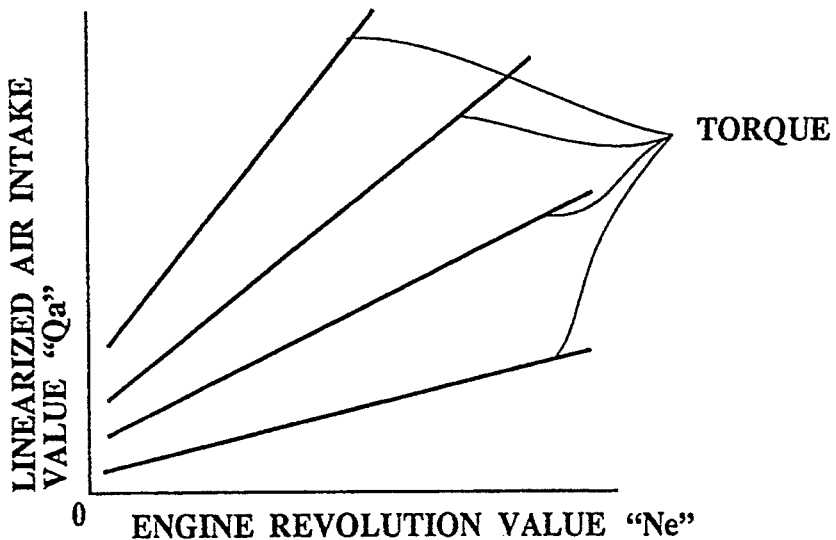
Figure 9:
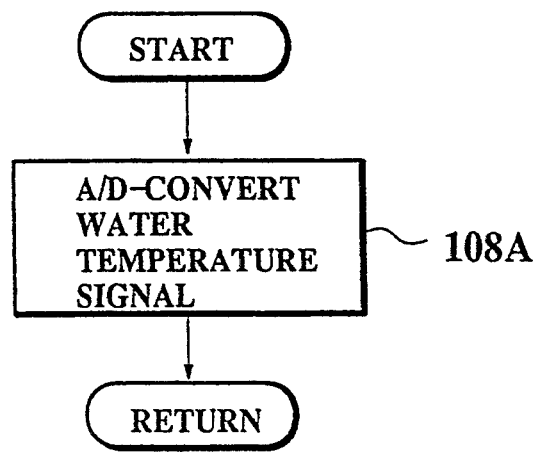
Figure 10:
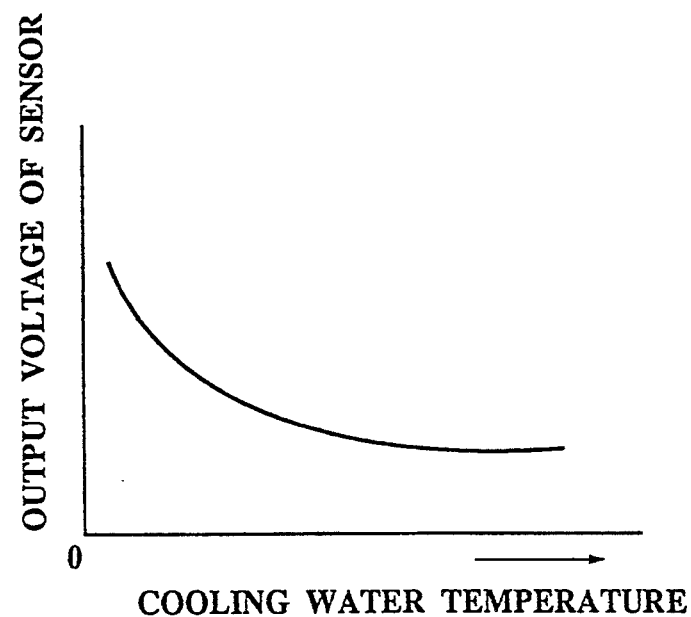

Referring back to the flow chart of FIG. 4, the process is advanced to a step 107, at which first torque To₁' is obtained from both of the above-described linearized air intake amount "Qa" and engine revolution value "Ne" with employment of an engine characteristic data table which has been previously set, as represented in FIG. 8. Subsequently, cooling water temperature data "Tw" is stored in RAM at a step 108. That is, as shown in FIG. 9, the sensor signal outputted from the water temperature sensor 4 is A/D-converted in the second A/D converter 32 at, for instance, 20 ms period, and then the A/D-converted water temperature signal is further converted into the cooling water data "Tw" with employment of a characteristic table for the water temperature sensor 4, as shown in FIG. 10.

Figure 11:
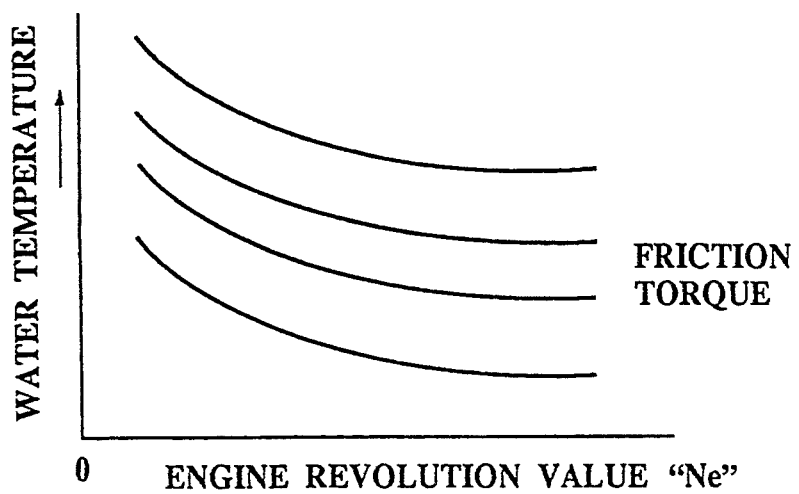

Then the process is advanced to a further step 109 at which friction torque "Tf" is calculated from the above-described engine revolution data "Ne" and cooling water temperature "Tw" with employment of a friction torque table as shown in FIG. 11. Then, second torque To2' is calculated by correcting the above-described torque To1' obtained at the previous step 107 with the friction torque Tf in accordance with the following equation (1):

$$To_2' = To_1' - Tf \qquad (1)$$

At the subsequent step 110, ON/OFF conditions of the auxiliary equipments such as the air conditioner and power steering device (boths are not shown) are sensed by the air conditioner switch 5 and the power steering switch 6 and these sensor signals are supplied via the input interface 40 into RAM 72 for storage purposes. Then, loss power "Th" is defined based on these sensor data stored in RAM 72 and also the above-described engine revolution valve "Ne", and the above-described second torque To2' is corrected in accordance with the following equation (2) so as to calculate third torque To3':

$$To_3' = To_2' - Th \qquad (2)$$

Thereafter, acceleration Ne' of engine revolution is calculated by the engine revolution value "Ne" at a step 112. At the next step 113, loss power Ie·Ne' for accelerating the engine 1 is obtained based on preset inertia data Ie and the revolution acceleration Ne'. Then, the third torque To3' is corrected in accordance with the following equation (3) so as to calculate fourth torque To' under control of CPU 60:

$$To' = To_3' - Ie \cdot Ne' \qquad (3)$$

As a consequence, the fourth torque To' corresponds to a predicted value of normal engine power which is derived from the normal power predicting means 200 shown in FIG. 2.

Actual Power Calculation

An actual power calculation performed by the actual power calculating means 210 shown in FIG. 2 will now be described with reference to a flow chart shown in FIG. 12.

Figure 12:
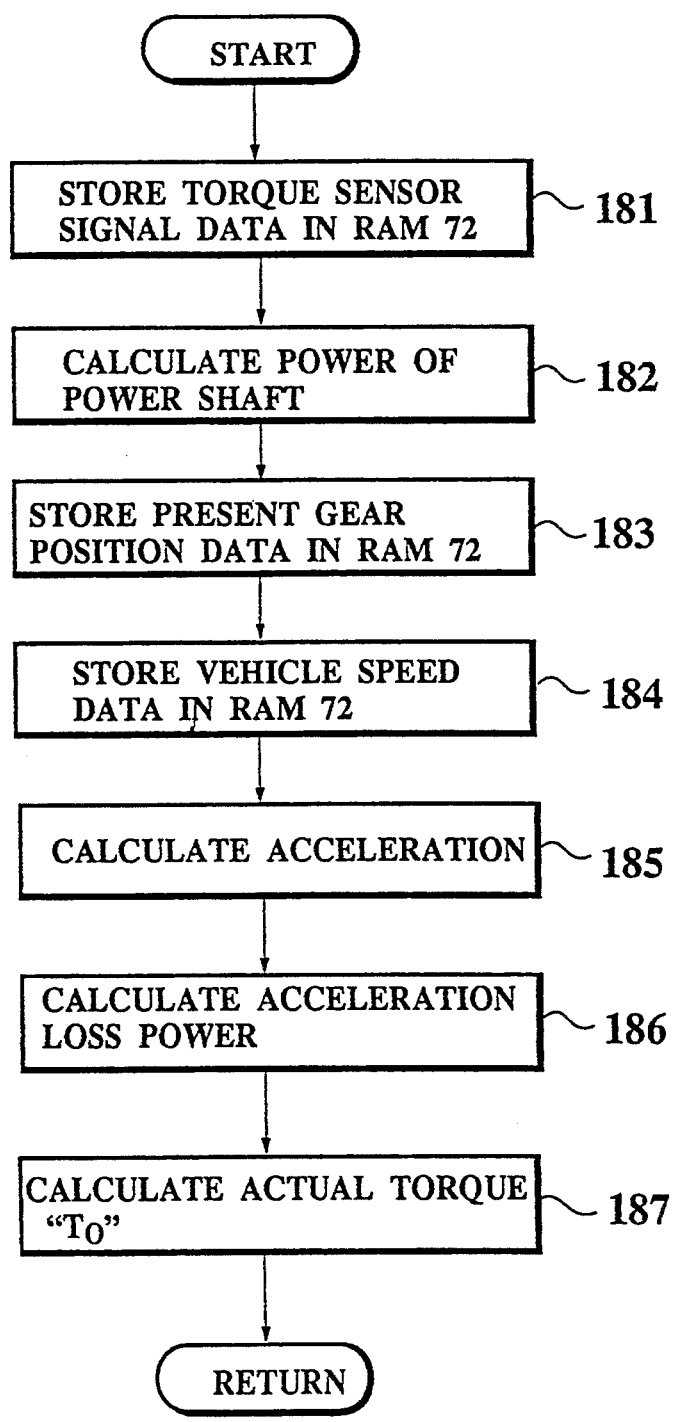
Figure 13:
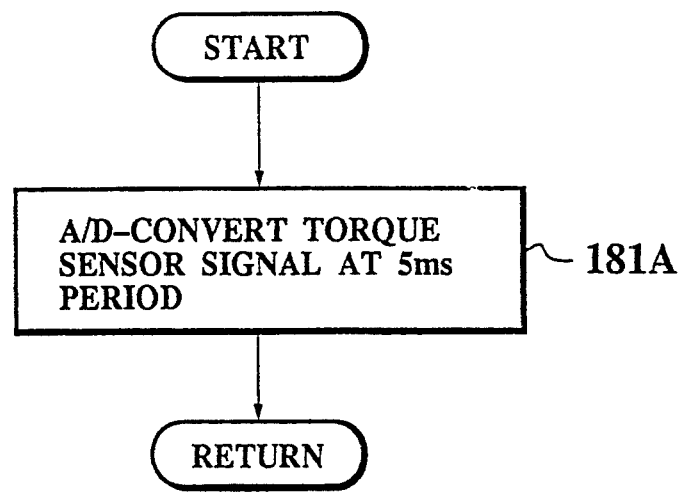
Figure 14:
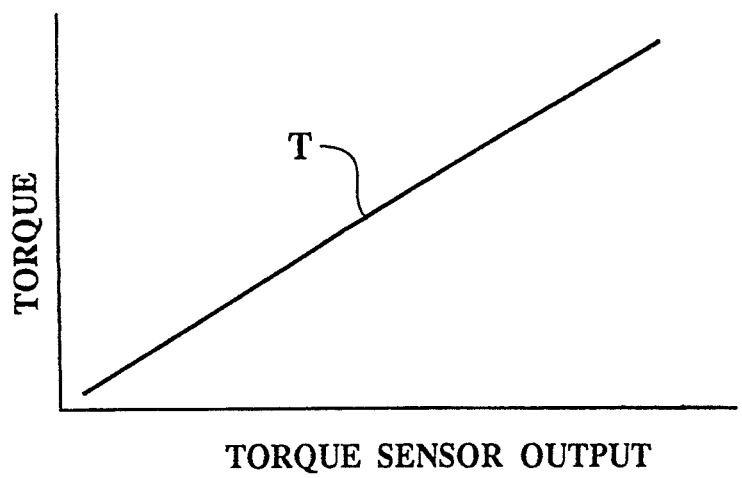
Figure 15A:
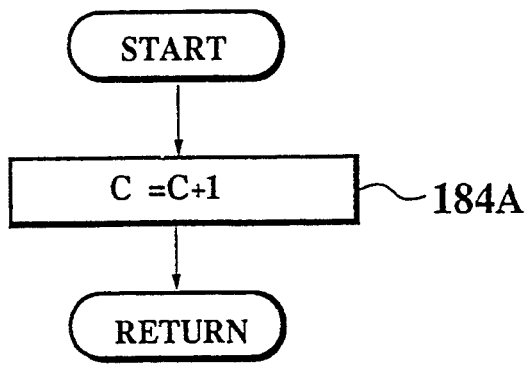
Figure 15B:
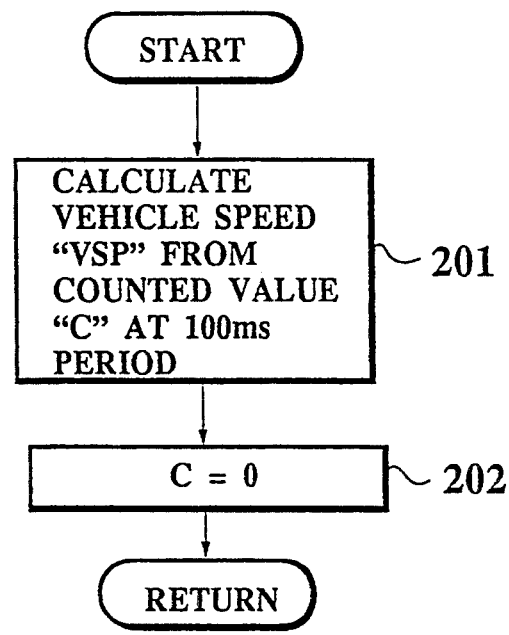

At a first step 181 of the flow chart shown in FIG. 12, the torque sensor signal outputted from the torque sensor 8 is A/D-converted by a third A/D converter 34 shown in FIG. 3 and then the digital torque data derived from this A/D converter 34 is stored in RAM 72. This A/D conversion of the torque sensor signal is performed, for instance, in 5 ms period as shown in a step 181A of FIG. 13. At a further step 182, power "T" of the power shaft is calculated based upon a table of sensor characteristic data as represented in FIG. 14. Subsequently, a gear position signal derived from the means 230 for judging gear positions (will be described later) is acquired and stored into RAM 72 at a step 183. Thereafter, a vehicle speed data "VSP" is stored in RAM 72 at a step 184. This is done as follows: As represented in FIG. 15A, for example, pulse signals derived from the vehicle speed sensor 11 are counted for a predetermined time period (e.g., 100 ms), and then the vehicle speed "VSP" is calculated from the counted value "C" at a further step 201 of FIG. 15B. After this calculation, the count value "C" is reset to zero at a step 202 and the pulse signals from the vehicle 11 are again counted.

Returning to a step 185, a calculation is made of vehicle acceleration VSP' based upon differences in the vehicle speed values obtained every the above-described calculation time 100 ms. The process is advanced to a step 186 at which a calculation is made of loss power for accelerating the drive system based on inertia data "Iv" of the drive system corresponding to the gear position of the power transmission system 7 and also the above-calculated vehicle acceleration VSP'. Then, the corrected power "Tc" of the power shaft is calculated by adding this loss power to the above-described power "T" of the power shaft. At the next step 187, fifth torque "To" is calculated based on a gear ratio "g" corresponding to the gear position of the power transmission system 7 ant this corrected power "Tc" of the power shaft in accordance with the following equation (4) under control of CPU 60.

$$To = g \cdot T \qquad (4)$$

As a result, this fifth torque "To" corresponds to a desirable actual power value of the engine 1, which is derived from the actual power calculating means 210.

Present Gear Position Judgement

Figure 16:
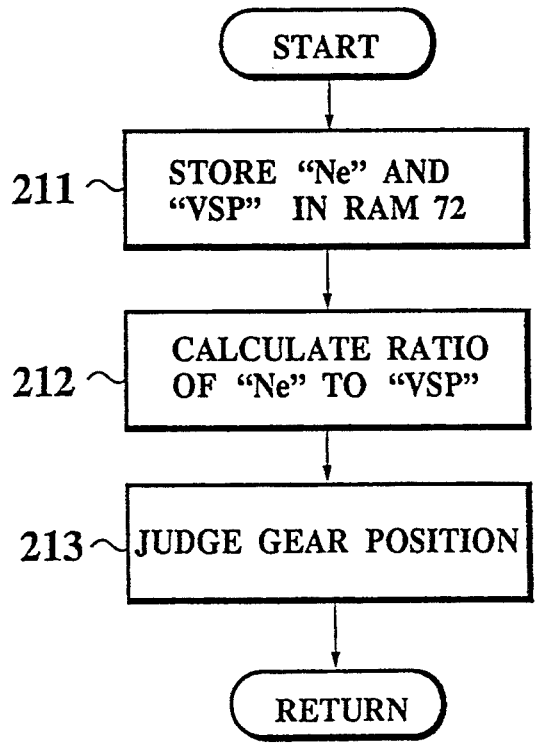

An operation flow of the gear position judging means 230 will now be described with reference to FIG. 16.

Figure 17:
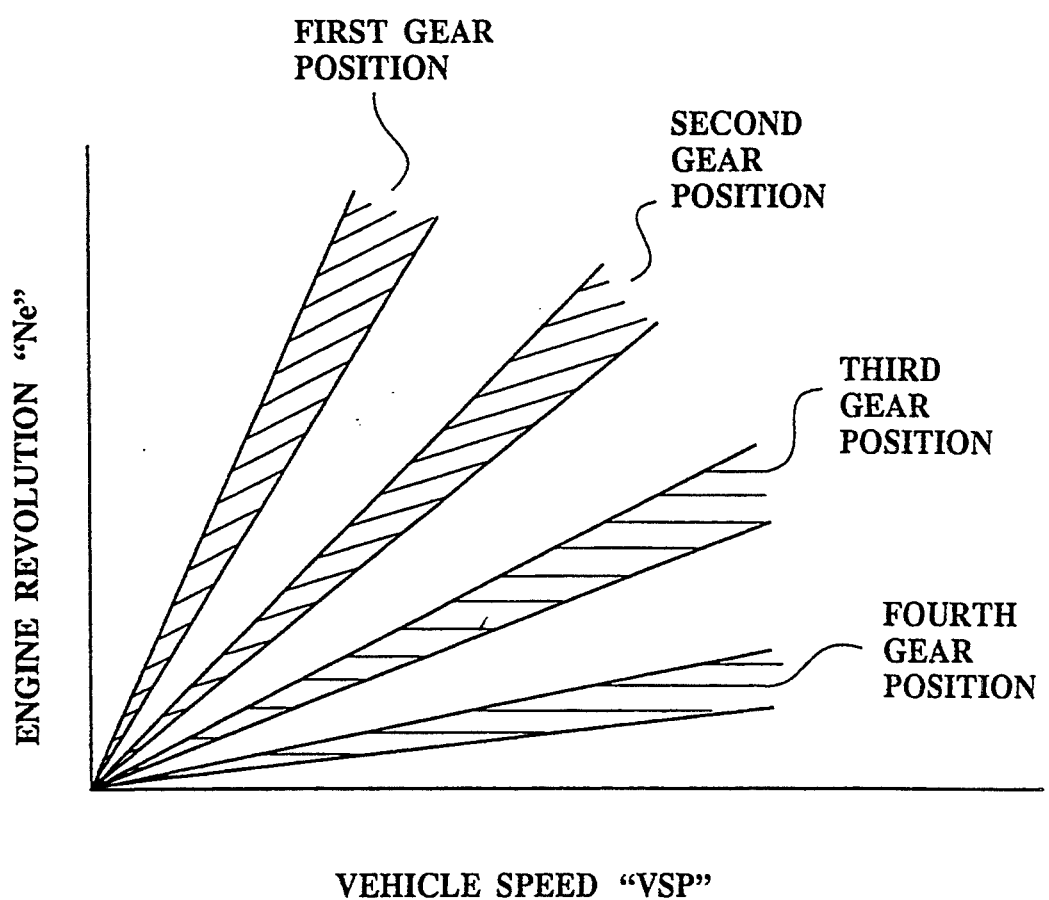

At a first step 211, the engine revolution data "Ne" is read into RAM 72 in a similar manner for the above-described normal power predicting means 200, and also the vehicle speed data VSP is read in RAM 72 in a similar way for the above-described actual power calculating means 210. Then, this process is advanced to a step 212 at which a ratio of the engine revolution data "Ne" to the vehicle speed data "VSP" is calculated. At the next step 213, a judgement is performed that the present gear position is defined by a gear position range table as shown in FIG. 17. It should be noted that if the resultant ratio does not belong to any gear position ranges, the previous result is held. Then, the resultant gear position signal corresponding to the judged present gear position is supplied to the actual power calculating means 210.

Engine Power Trouble Judgement

Referring now to a flow chart of FIG. 18, an engine power trouble judgement effected by the engine power trouble judging means 220 will be described in accordance with the first preferred embodiment of the present invention.

Figure 18:
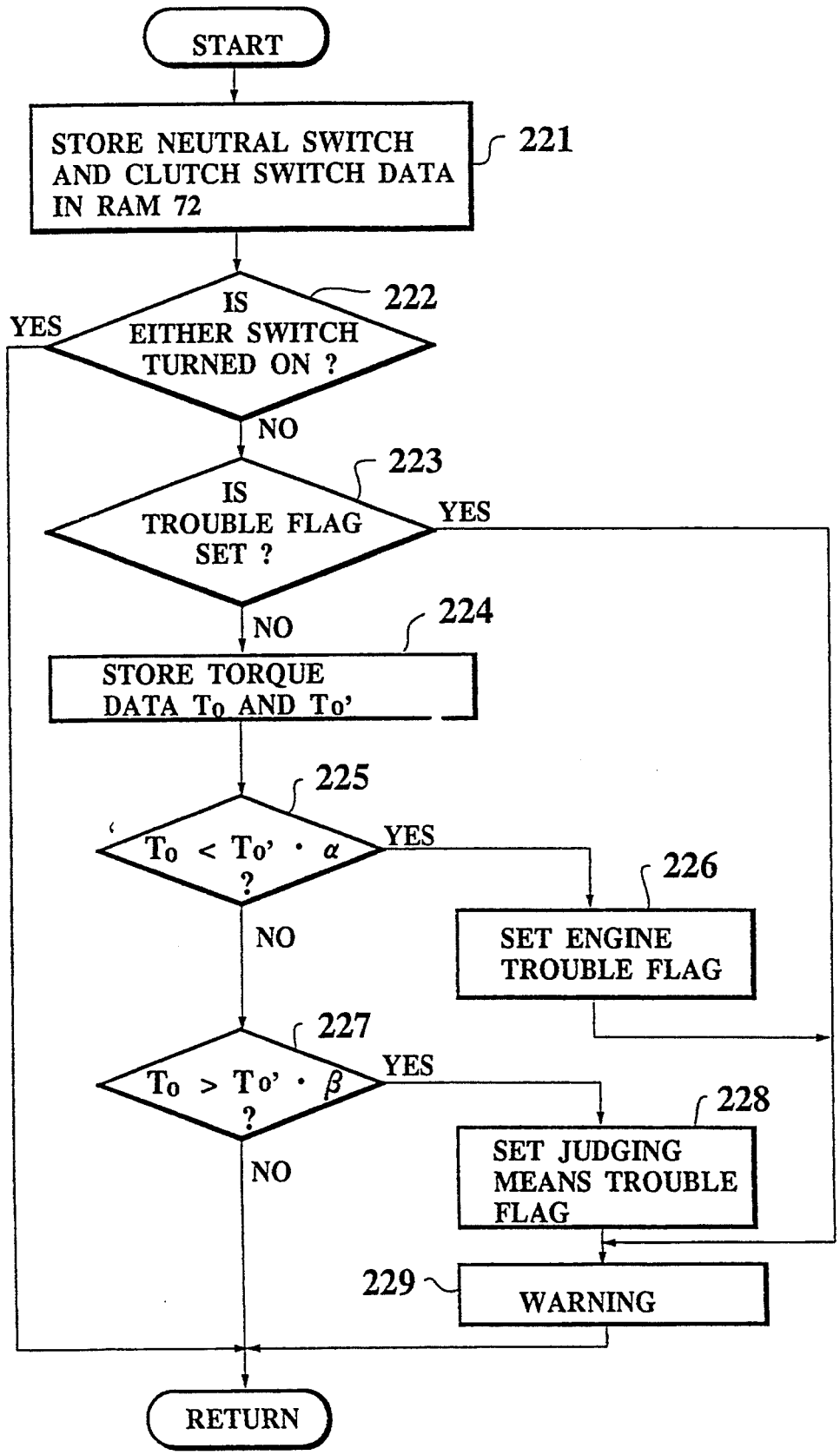

At a first step 221 shown in FIG. 18, both the ON/OFF state data of the neutral switch 9 and the clutch switch 10 are acquired via the input interface 40 into RAM 72. Then, the process is advanced to a step 222 at which a judgement is made whether either the neutral switch 9 or the clutch switch 10 is turned ON or OFF. If either the neutral switch 9 or the clutch switch 10 is turned ON, then no engine power trouble judgement is carried out and the previous judgement result is maintained. To the contrary, when both the neutral switch 9 and the clutch switch 10 are turned OFF, the judgement process is advanced to a step 223 at which another check is made whether or not extraordinary flag of the normal output predicting means 200 has been set. If this extraordinary flag has been set, the process is advanced to a step 229 at which a warning signal is supplied to the warning means 260, so that warning of engine power trouble is given to a car driver. Conversely, if no extraordinary flag has been set at the previous step 223, the process is advanced to a next step 224. At this step 224, both the above-defined predicted normal power value (torque) To' obtained from the normal power predicting means 200 and also the above-defined actual power value (torque) To obtained from the actual power calculating means 210 are stored into RAM 72. Thereafter, at the next step 225, a judgement is made whether or not the actual power value "To" is smaller than To'·α (symbol "α" denotes a predetermined value smaller than 1, for example, 0.8 in this preferred embodiment); namely To<To'·α. If YES, then the process is advanced to a step 226 at which the engine trouble flag is set. Thus, the warning signal is supplied to the warning means 260 so as to give warning of engine power trouble to the car driver at a step 229. It should be noted that the judgement basis of the previous step 225 may be selected as To<To'−α' where symbol α' denotes a preselected value that is different from the first-mentioned value of α and exceeds zero.

If NO at the previous step 225, then the process is advanced to a step 227.

At the step 227, a comparison is made between the actual power value "To" and the predicted normal power value To'·β thereby to judge whether or not To>To'·β. It should be noted that symbol "β" is an predetermined value exceeding 1, for instance, 1.2 in this preferred embodiment. If YES (namely To>To'·β), then the process is advanced to a step 228. At this step 228, it is judged that either the normal power predicting means 200 or the actual power calculating means 210 is brought into an abnormal state, so that a judging-means trouble flag is set and the process is advanced to a step 229. Then, similarly, warning is issued from the warning means 260 at this step 229.

It should be understood that the judgement basis at the previous step 227 may be selected to be To<To'+β' wherein symbol β' is different from the above-described "β" and exceeds zero.

As previously described in accordance with the first engine power trouble detecting apparatus 1000 as shown in FIGS. 2 to 18, in the manual transmission type automobile, the normal power value To' of the engine 1 is predicted by the normal power predicting means 200; the actual power value To of the engine 1 is calculated by the actual power calculating means 210; the predicted normal power value To' is compared with the actual power value To by the engine power trouble judging means 220, whereby the judgement is made whether or not the power value of the engine 1 is extraordinary. As a consequence, the power trouble of the engine 1 is detectable during the normal driving operation of the vehicle and this warning is given by the warning means 260 to the car driver.

Overall Arrangement of Second Engine Power Trouble Detecting apparatus

Figure 19:
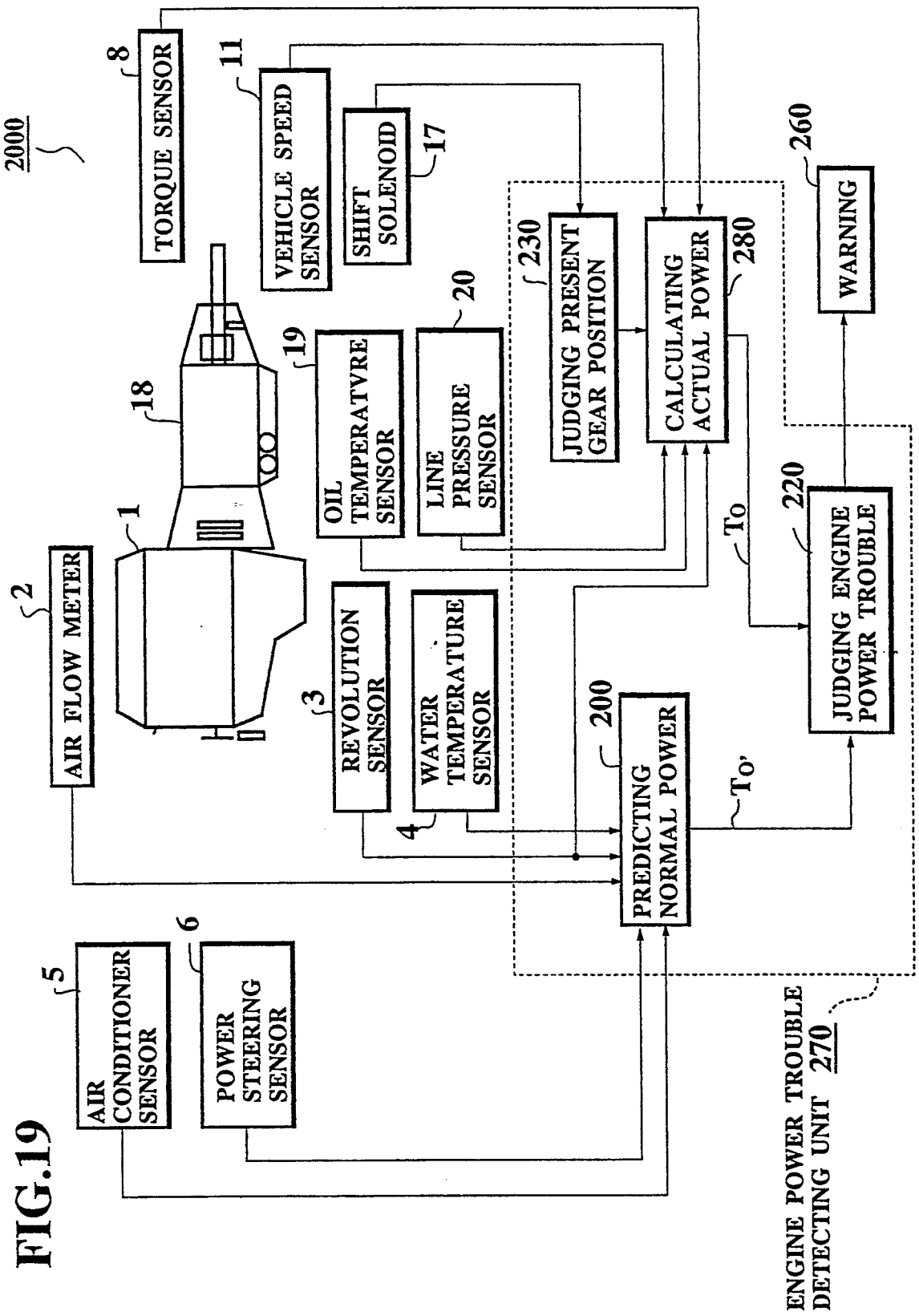
FIG. 19 is a schematic block diagram for showing an overall arrangement of an engine power trouble detecting apparatus (2000) according to a second preferred embodiment of the present invention.

In FIG. 19, there is shown an engine power trouble detecting apparatus 2000, according to a second preferred embodiment of the present Invention, which has been applied to an automobile equipped with an automatic transmission system (not shown in detail).

It should be noted that since the same reference numerals shown in FIG. 2 will be employed for denoting the same or similar circuit elements represented in FIG. 19, no further explanation is made in the following description. Reference numeral 18 indicates an automatic transmission system and reference numeral 17 denotes a (gear) shift solenoid from which a shift solenoid signal is supplied to a gear position judging means 275, whereby the present gear position of the automatic transmission system 18 can be detected. Reference numeral 19 represents an oil temperature sensor for sensing temperatures of oil used in the automatic transmission system 18, and also reference numeral 20 denotes a line pressure sensor for detecting line pressures in the automatic transmission system 18. In the second engine power trouble detecting apparatus 2000, the gear position judging means 230, the normal power predicting means 200, the actual power calculating means 280, and also the engine power trouble judging means 220 constitute a second engine power trouble detecting unit 270. As apparent from the foregoing description and FIG. 19, neither a nuetral switch nor a clutch switch is employed.

In accordance with the second engine power trouble detecting apparatus 2000, the operations of both the normal power predicting means 200 and the engine power trouble judging means 220 are the same as those of the first engine power trouble detecting apparatus 1000 shown in FIG. 2, and therefore only operations of the actual power calculating means 280 will now be described.

Internal Arrangement of Second Engine Power Trouble Detecting Unit

Figure 20:
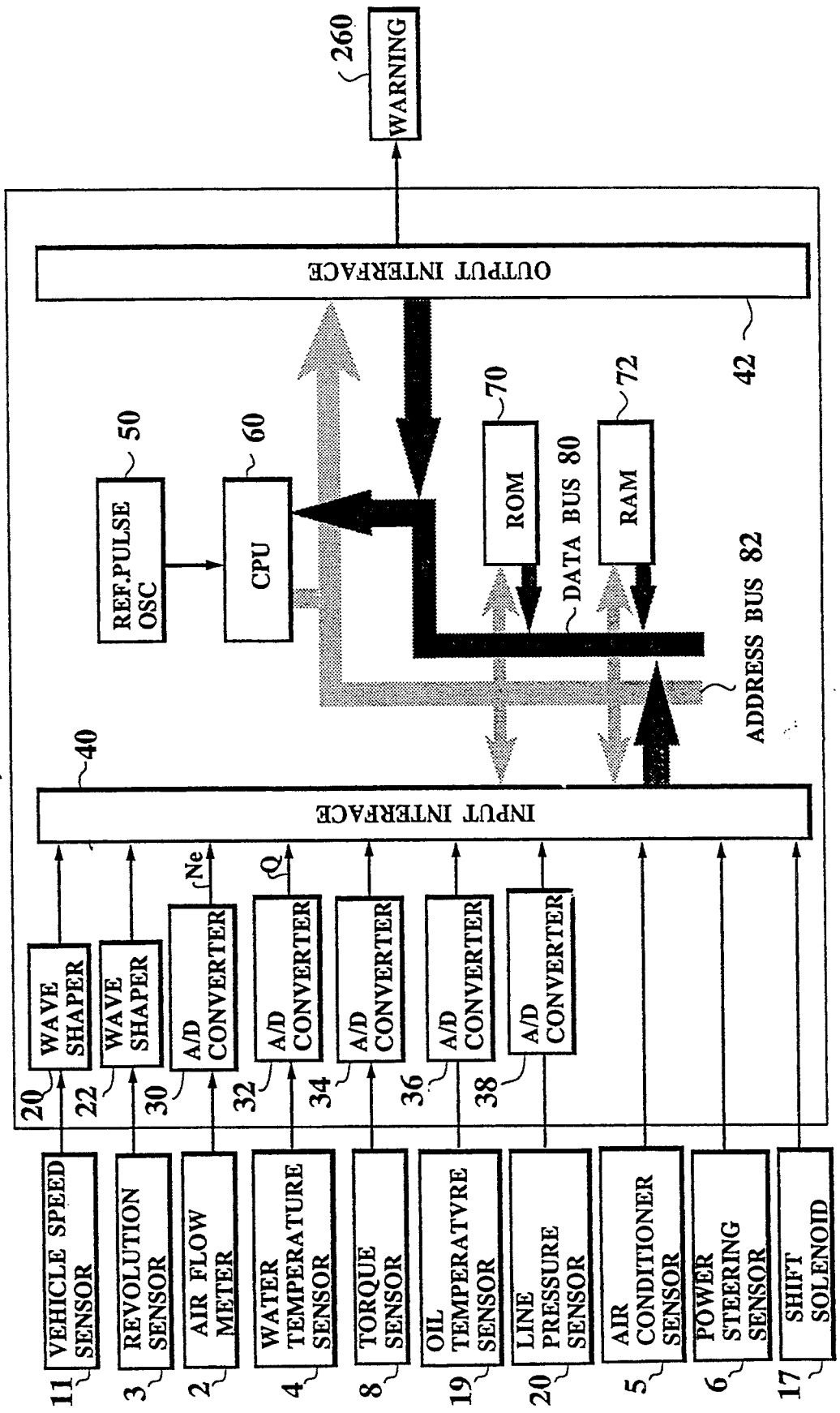
FIG. 20 is a schematic block diagram for showing an internal arrangement of the second engine power trouble detecting unit 270 shown in FIG. 19; and, FIGS. 21 to 23 represent how to calculate actual engine power performed by the second engine power trouble detecting apparatus (2000) shown in FIG. 19.

FIG. 20 represents as internal arrangement of the second engine power trouble detecting unit 270. As apparent from FIG. 20, since most of this detecting unit 270 is the same as the first detecting unit 250 shown in FIG. 3, only different circuit elements described. That is, a fourth A/D converter 36 is newly employed to A/D-convert the sensor signal derived from the oil temperature sensors 19 and to supply the oil temperature data via the input interface unit 40 to RAM 72. Furthermore, a fifth A/D converter 38 is provided to A/D-convert the sensor signal from the line pressure sensor 20 and similarly to supply the line pressure data via the input interface unit 42 to RAM 72. The output signal from the shift solenoid 17 is also supplied via the input interface unit 40 to RAM 72.

When a warning signal is produced under control of CPU 60, this warning signal is supplied via an output interface unit 42 to the warning means 260.

Actual Power Calculation

Figure 21:
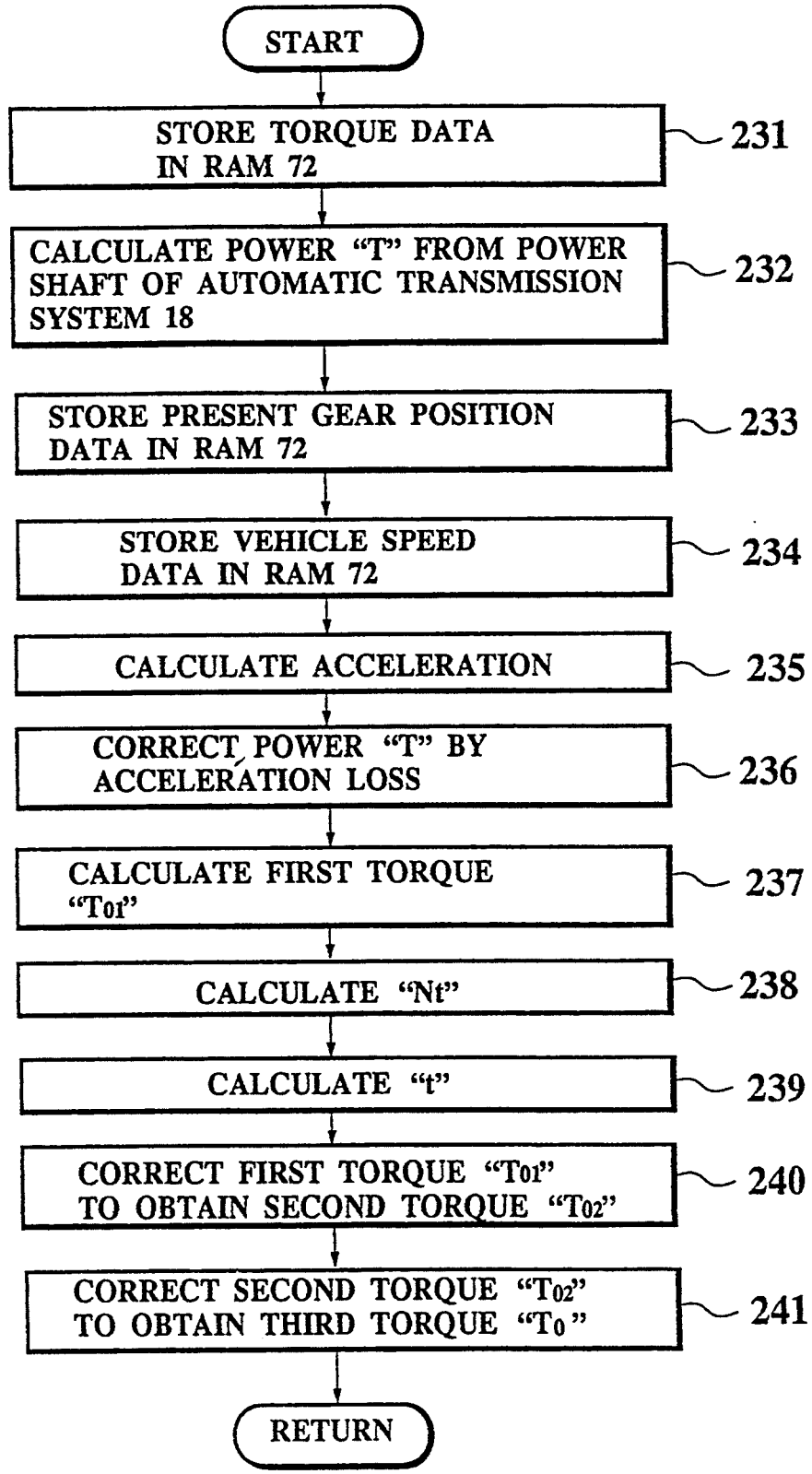

An actual power calculation effected by the actual power calculating means 280 will now be explained with reference to a flow chart of FIG. 21.

Figure 22:
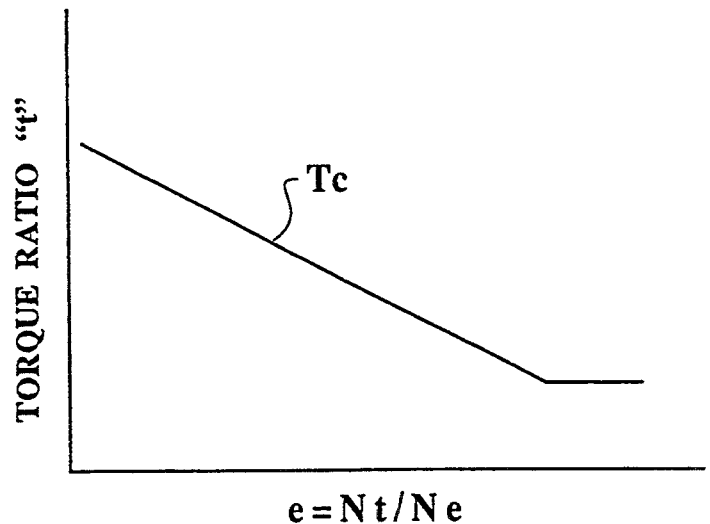

At a first step 231, the torque data obtained from the torque sensor 8 through the third A/D converter 34 is stored into RAM 72 via the input interface unit 40. Then, at a step 232, power "T" of the power shaft of the automatic transmission system 18 is calculated from this torque data based upon a torque sensor characteristic data table as shown in FIG. 22. Subsequently, the present gear position signal from the gear position detecting means 230 is stored into RAM 72 at a step 233 and the process is advanced to a step 234 at which the vehicle speed data "VSP" that has been obtained from the pulse signals of the vehicle speed sensor 11, is stored into RAM 72. At the next step 235, an acceleration value VSP' for vehicle is calculated in CPU 60 based on the differences in the vehicle speed data VSP counted at predetermined intervals.

At the next step 236, loss power for accelerating the drive system of the vehicle is calculated in CPU 60 with employment of both inertia data "Iv" corresponding to the present gear position and the calculated acceleration VSP'. Then, the resultant loss power is added to the above-described power "T" of the power shaft of the automatic transmission system 18, whereby corrected power "Tc" of this power shaft is obtained. At the subsequent step 237, first torque "To₁" is calculated under control of CPU 60 from both the gear ratio "g" corresponding to the present gear position and the corrected power Tc of the power shaft based upon the below-mentioned equation (5):

$$To_1 = g \cdot Tc \qquad (5)$$

Thereafter, at a step 238, an input revolution value "Nt" of the automatic transmission system 18 (namely, revolution value of turbine) is calculated based upon the vehicle speed VSP and the gear ratio "g". Then, at a step 239, a speed ratio of torque converter "e" is calculated from this revolution value "Nt" of turbine and the revolution value "Ne" of engine 1 as follows:

$$e = Nt/Ne \qquad (6)$$

Based upon this speed ratio "e" of the torque converter, a torque ratio "t" of the automatic transmission system 18 is further calculated by utilizing a torque converter characteristic "Tc" as shown in FIG. 22. At the next step 240, the first torque "To₁" is corrected in accordance with the following equation (7) to obtain second torque "To₂":

$$to_2 = To_1/t \qquad (7)$$

At the final step 241, a calculation is made of loss power in an oil pump (not shown in detail) based upon the oil temperature data from the oil temperature sensor 19, the line pressure data from the line pressure sensor 20, the revolution value Nt of turbine, and preset oil pump characteristic data. Furthermore, the calculated oil pump loss power is added to the second torque "To₂" in order to finally obtain third torque "To". As a consequence, this third torque "To" corresponds to the actual power of the engine 1 which is produced from the actual power calculating means 280 shown in FIG. 19.

As a result, in FIG. 19, the predicted normal power To' derived from the normal power predicting means 200 is compared with the calculated actual power "To" derived from the actual power calculating means 280 by the engine power trouble judging means 220, so that in case of engine power trouble or extraordinary states of the judging means, warning is issued from the warning means 260 to the car driver.

Modification of Actual Power Calculation

Figure 23:
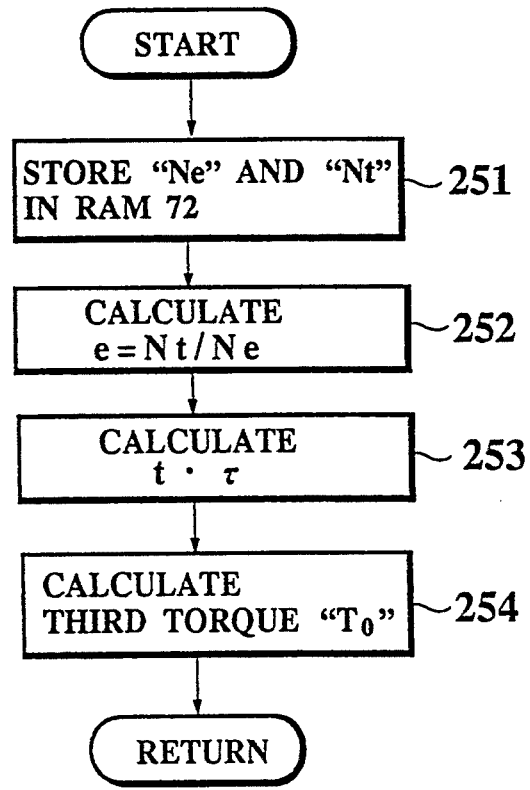

The above-described actual power (To) calculation effected by the actual power calculating means 280 may be modified as follows. As represented in FIG. 23, at a first step 251, both the engine revolution data "Ne" and the turbine revolution data "Nt" are read into RAM 72. Thereafter, the speed ratio of torque converter "e" is similarly calculated by the above equation (6). At the subsequent step 253, a calculation is performed to obtain (t·τ) corresponding to the speed ratio "e" in accordance with preset characteristic data on the torque converter. Note that symbol "t" indicates a torque ratio and symbol "τ" denotes a torque capacity coefficient. Next, the desirable actual power "To" is calculated from the engine revolution data "Ne" and the value (t·τ) at a final step 254 by the following equation (8):

$$To = (t \cdot \tau) \times Ne^2 \qquad (8)$$

It should be understood that since the characteristics of the automatic transmission system 18 are utilized in the second engine power trouble detecting apparatus 2000, this actual power "To" cannot be calculated under lock-up conditions.

Moreover, although the present gear position was judged by the gear position judging means 230 in response to the signal from the shift solenoid 17, this gear position may be alternatively judged in response to an output signal from a control circuit (not shown) of the automatic transmission system 18.

Also, both of the first and second engine power trouble detecting units 250 and 270 may be manufactured by microcomputers.

What is claimed is:

1. A method for detecting an abnormal power condition in an engine, comprising the steps of:
    predicting a power value derived from the engine under a normal state based upon at least a revolution value of the engine and an air intake amount thereof;
    calculating an actual power value of the engine based on at least a power value derived from a power shaft of a power transmission system; and
    comparing the predicted power value with the calculated actual power value thereby to detect an abnormal power condition occurring in the engine.

2. The method for detecting an abnormal power condition in an engine as claimed in claim 1, wherein said calculating step further utilizes present gear position data so as to obtain said actual power value of the engine.

3. The method for detecting an abnormal power condition in an engine as claimed in claim 1, further comprising the step of:
    producing a warning signal when an abnormal power condition is detected in the engine.

4. An engine power trouble detecting apparatus comprising:
    predicting means for predicting a power value derived from an engine under a normal state based upon at least a revolution value of the engine and an air intake amount thereof;
    calculating means for calculating an actual power value of the engine based on at least a power value derived from a power shaft of a manual power transmission system; and
    comparing means for comparing the predicted power value predicted by said predicting means with the actual power value calculated by said calculating means thereby to detect an abnormal power condition occurring in the engine.

5. An engine power trouble detecting apparatus as claimed in claim 4, further comprising:
    means for detecting the present gear position of the manual power transmission system in response to the revolution value of the engine and also a vehicle velocity, to thereby supply a present gear position signal to the calculating means.

6. An engine power trouble detecting apparatus as claimed in claim 4, further comprising:

means for warning an operator of the engine when an abnormal power condition in the engine is detected by said comparing means.

7. An engine power trouble detecting apparatus as claimed in claim 4, wherein said predicting means further utilizes a water temperature sensing signal so as to predict the normal power value of the engine.

8. An engine power trouble detecting apparatus as claimed in claim 4, wherein said predicting means further utilizes an ON/OFF signal from an auxiliary equipment of the engine so as to predict the normal power value of the engine.

9. An engine power trouble detecting apparatus as claimed in claim 8, wherein said auxiliary equipment of the engine includes at least one of an air conditioner compressor and a power steering pump.

10. An engine power trouble detecting apparatus as claimed in claim 4, wherein said calculating means further utilizes a vehicle velocity signal to calculate the actual power value of the engine.

11. An engine power trouble detecting apparatus as claimed in claim 4, wherein said comparing means further utilizes a clutch ON/OFF state signal in order to detect an abnormal power condition occurring in the engine.

12. An engine power trouble detecting apparatus as claimed in claim 4, wherein said comparing means further utilizes a neutral state sensing signal so as to detect an abnormal power condition occurring in the engine.

13. An engine power trouble detecting apparatus comprising:
    predicting means for predicting a power value derived from an engine under a normal state based upon at least a revolution value of the engine and an air intake amount thereof;
    calculating means for calculating an actual power value of the engine based on at least a power value derived from a power shaft of an automatic power transmission system; and
    comparing means for comparing the predicted power value predicted by said predicting means with the actual power value calculated by said calculating means thereby to detect an abnormal power condition occurring in the engine.

14. An engine power trouble detecting apparatus as claimed in claim 13, further comprising:
    means for detecting the present gear position of the automatic power transmission system in response to a gear shift solenoid sensing signal, to thereby supply a present gear position signal to the calculating means.

15. An engine power trouble detecting apparatus as claimed in claim 13, further comprising:
    means for warning an operator of the engine when an abnormal power condition in the engine is detected by said comparing means.

16. An engine power trouble detecting apparatus as claimed in claim 13, wherein said predicting means further utilizes a water temperature sensing signal so as to predict the normal power value of the engine.

17. An engine power trouble detecting apparatus as claimed in claim 16, wherein said calculating means further utilizes said water temperature sensing signal so as to calculate the actual power value of the engine.

18. An engine power trouble detecting apparatus as claimed in claim 13, wherein said predicting means further utilizes an ON/OFF signal from an auxiliary equipment of the engine so as to predict the normal power value of the engine.

19. An engine power trouble detecting apparatus as claimed in claim 18, wherein said auxiliary equipment of the engine includes at least one of an air conditioner compressor and a power steering pump.

20. An engine power trouble detecting apparatus as claimed in claim 13, wherein said calculating means further utilizes a vehicle velocity signal to calculate the actual power value of the engine.

21. An engine power trouble detecting apparatus as claimed in claim 13, wherein said calculating means further utilizes an oil temperature sensing signal so as to calculate the actual power value of the engine.

22. An engine power trouble detecting apparatus as claimed in claim 13, wherein said calculating means further utilizes a line pressure sensing signal so as to calculate the actual power value of the engine.

* * * * *